(12) United States Patent
Braghiroli

(10) Patent No.: US 7,523,655 B2
(45) Date of Patent: Apr. 28, 2009

(54) METHOD OF OPTICALLY SCANNING THE TREAD SURFACE OF A PNEUMATIC TYRE OF A VEHICLE WHEEL

(75) Inventor: Francesco Braghiroli, Reggio Emilia (IT)

(73) Assignee: Snap-On Equipment SRL a Unico Socio, Correggio (IT)

( * ) Notice: Subject to any disclaimer, the term of this patent is extended or adjusted under 35 U.S.C. 154(b) by 69 days.

(21) Appl. No.: 11/783,950

(22) Filed: Apr. 13, 2007

(65) Prior Publication Data

US 2008/0011074 A1   Jan. 17, 2008

(30) Foreign Application Priority Data

Apr. 13, 2006   (EP)   ................................ 06007848
May 10, 2006   (EP)   ................................ 06009685

(51) Int. Cl.
*G01M 17/02* (2006.01)
(52) U.S. Cl. ........................................................ 73/146
(58) Field of Classification Search ........ 73/146–146.9; 340/442–447
See application file for complete search history.

(56) References Cited

U.S. PATENT DOCUMENTS

| | | | |
|---|---|---|---|
| 3,918,816 A | 11/1975 | Foster et al. | |
| 4,932,784 A | 6/1990 | Danneskiold-Samsoe | |
| 5,987,978 A * | 11/1999 | Whitehead | .................... 73/146 |
| 6,069,966 A * | 5/2000 | Jones et al. | ................. 382/100 |
| 6,535,281 B2 | 3/2003 | Conheady et al. | |
| 6,634,223 B2 * | 10/2003 | Hartmann et al. | .............. 73/146 |
| 6,691,566 B2 * | 2/2004 | Iwasaki et al. | ................. 73/146 |
| 6,789,416 B1 * | 9/2004 | Tracy et al. | .................... 73/146 |
| 6,802,130 B2 * | 10/2004 | Podbielski et al. | ............ 33/288 |
| 7,114,383 B2 * | 10/2006 | Byrne | .......................... 73/146 |
| 7,269,997 B2 * | 9/2007 | Dale et al. | ..................... 73/146 |
| 7,299,693 B2 * | 11/2007 | Byrne | .......................... 73/146 |
| 7,299,694 B2 * | 11/2007 | Byrne | .......................... 73/146 |
| 7,355,687 B2 * | 4/2008 | Voeller et al. | .......... 356/139.09 |
| 7,398,176 B2 * | 7/2008 | Bertness | ..................... 702/140 |

FOREIGN PATENT DOCUMENTS

| | | |
|---|---|---|
| EP | 0 547 364 | 6/1993 |
| EP | 0 547 365 | 6/1993 |
| EP | 1 174 698 | 1/2002 |
| EP | 1 512 954 | 3/2005 |
| EP | 1 515 129 | 3/2005 |
| WO | WO 02/48648 | 6/2002 |

* cited by examiner

*Primary Examiner*—Andre J Allen
*Assistant Examiner*—Jermaine Jenkins
(74) *Attorney, Agent, or Firm*—McDermott Will & Emery LLP

(57) ABSTRACT

A method of and an apparatus for optically scanning the tread surface of a pneumatic tire 10 which for forming a vehicle wheel 1 is mounted on a disc wheel 5, wherein measurement data are obtained along a plurality of peripheral lines by light beam scanning, said data corresponding to the spacings of the impingement points of the light beams on the tread surface from a reference position, wherein associated first or higher harmonics for quality classification of the rotational truth of the vehicle wheel are formed in a computer-aided evaluation apparatus 9 from the measurement data along the respective peripheral lines.

10 Claims, 3 Drawing Sheets

METHOD OF OPTICALLY SCANNING THE TREAD SURFACE OF A PNEUMATIC TYRE OF A VEHICLE WHEEL

The invention concerns a method of optically scanning the tread surface of a pneumatic tyre of a vehicle wheel as set forth in the classifying portion of claim 1.

In a method of that kind which is known from EP 1 515 129 A1 the vehicle wheel is rotated about a stationary axis, for example on a balancing machine, and from a given position light beams, for example laser beams from a given position, are directed on to the tread surface of the pneumatic tyre and reflected from there. To determine the spacings of the impingement points of the light beams on the tread surface from a reference position, the directions of the reflected beams are detected, in which case the operation of scanning the tyre tread surface can be carried out along a plurality of peripheral lines which are in mutually juxtaposed relationship in the axial direction. A method of that kind is also known from EP 0 547 365 A2.

The known methods serve for detecting the profile depth of the tyre tread surface and for detecting tyre wear.

The problem of the invention is to provide a method of the kind set forth in the opening part of this specification, which provides information about the rotational truth or axial truth characteristics of the vehicle wheel.

That problem is solved according to the invention by the features of claim 1.

The invention provides for forming, in rotary angle-related fashion, from the measurement data which are ascertained in the scanning operation along the plurality of peripheral lines, first harmonics and/or higher harmonics which are associated with the respective peripheral lines. In addition a first and/or higher harmonic which is averaged from the raw data or the harmonics determined in the different peripheral lines can be formed in rotary angle-related fashion.

Raw data (pure measured data along the peripheral. lines) can be shown. An average of the raw data from the different peripheral lines can be shown as well. Data (raw data and harmonics) can be shown in the form of a Cartesian plot, polar plot, or also a 3D plot where a wheel is shown schematically in a perspective view with the data overlapped to the tread.

That harmonic formation procedure provides information relating to the rotational truth or axial truth characteristics of the tyre or vehicle wheel. In particular it is possible to ascertain a rotational truth deviation in the form of a radial run-out. As the measurement data are obtained along a plurality of peripheral lines a corresponding rotational truth deviation vector can be formed. In that case the spatial direction of the vector can be determined as the measurement data are detected both in dependence on rotary angle and also in the axial direction, that is to say in parallel relationship with the axis of rotation of the vehicle wheel. By using the value of the run-out and the spatial direction of the corresponding rotational truth deviation vector, it is possible to provide for minimising the mass of a static unbalance to be compensated in respect of the vehicle wheel and also for minimising the masses of a dynamic unbalance to be compensated in respect of the motor vehicle wheel, by turning (matching) the pneumatic tyre with respect to the disc wheel.

It is also possible to minimise the radial run out of the wheel assembly by matching the high spot of the tyre run out with the low spot of the rim run out. A combination of the radial run out, static unbalance and dynamic unbalance of the wheel assembly (EP 1512954) can be minimised, as well. The invention provides more accurate procedures.

The extent of the radial run-out can be compared to a threshold value in respect of run-out. In addition it is possible to perform quality gradation of the tyres in dependence on values within the predetermined run-out tolerance.

Further, it is possible to compare each run out value (raw data peak to peak, $1^{st}$ harmonic, $2^{nd}$ harmonic and so on) for each peripheral line to a specific threshold for each line or to the same threshold for all lines.

The measurement procedure can be carried out on a tyre which is on a measurement disc wheel, the geometrical data of which do not involve any rotational truth or axial truth deviations. It is however also possible to carry out the measurement operations on the tyre of a motor vehicle, which is to be fitted to a vehicle, for example a motor vehicle. The measurement operations are preferably effected by means of a balancing machine in which the vehicle wheel is fixed to the main shaft of the balancing machine for the measuring run.

The invention will be described in greater detail by means of an embodiment with reference to the FIGS. 1 to 4.

The FIG. 1 is a diagrammatic view showing a vehicle wheel 1, which in conventional manner comprises a disc wheel 5 and a rim 4 fixed to the periphery of the disc wheel 5. A pneumatic tyre 10 is mounted on the rim 4. Tyre beads are supported at rim flanges 6 of the rim 4 in known manner.

The vehicle wheel 1 and in particular the motor vehicle wheel is fixed in known manner to a measuring shaft 2 of a wheel balancing machine (not shown) at a fixing location 20 and is mounted rotatably about an axis of rotation which is defined by the measuring shaft 2 and which, in a centred clamping condition, coincides with a wheel axis 3. That ensures a stationary arrangement for the wheel axis 3 on the wheel, balancing machine.

The dimensions and positions of constituent parts of the tread surface of the pneumatic tyre 10 can be measured with one or more sensor devices 18 and ascertained with computer aid. The sensor device includes a light source 16 which is preferably in the form of a laser. In addition the sensor device 18 includes a receiver 12 which preferably has a CCD sensor as a position-sensitive receiving element. The light source 16 and the receiver 12 are fixed to a carrier 14. The carrier 14 is mounted pivotably about a pivot axis 17. In addition the carrier 14 can be mounted movably linearly (double-headed arrow 19) or on a predetermined guide path with respect to the measuring shaft 2 and the fixing 20 of the vehicle wheel 1 to the measuring shaft 2. The pivotal movement and the possibly additional linear or guided movement can be implemented by means of a drive (not shown), for example in the form of one or more stepping motors. An optical receiver system 13 is further provided on the carrier 14. The optical receiver system 13 and the CCD sensor 11 are constituent parts of the receiver 12.

The light source 16 emits a light beam onto the tread surface of the pneumatic tyre 10 and forms a light spot on the surface. From there the light is reflected in an associated reflected beam and passes through the focusing optical receiver system 13 onto the sensor elements of the CCD sensor 11. The CCD sensor 11 can detect separately from each other a plurality of local maxima of a lighting intensity function. The direction of the reflected beam depends on the distance of the location scanned on the pneumatic tyre 10 relative to the light source 16 and the receiver. In dependence on that distance the reflected beam is directed by way of the optical receiver system 13 onto a given location of the CCD sensor 11 and then converted into a position-sensitive or position-dependent signal. That signal is passed to an electronic measuring system 8 which is also connected to a position sensor 15. The position sensor 15 supplies the electronic measuring system 8 with position signals which are proportional to the respective positions of the light source 16 and the CCD sensor 11. The light source 16 and the receiver 12 are movable synchronously with each other as they are fixed to the common carrier 14. The position signals are related to a reference position provided on the machine (not shown) and thus related to the measuring shaft 2 mounted stationarily on the machine and the axial fixing location 20 at which the vehicle wheel 1 is fixed to the measuring shaft 2.

The electronic measuring system 8 produces measurement signals which correspond to the positions of the surface locations (spots) on the pneumatic tyre 10, which are scanned by the light beams emitted by the light source 16.

Suitable sensor devices 18 which measure with the triangulation procedure are known from EP 1 174 698 A2 (=U.S. Pat. No 6,535,281). It is however also possible to use only one sensor device 18 which can be moved into suitable measurement positions on a predetermined guide path at the tread surface of the pneumatic tyre 10.

The electronic measuring system 8 which provides the corresponding measurement signals can be a constituent part of the respective sensor device 18. It is however also possible for the electronic measuring system 8 to be integrated into an evaluation apparatus 9 which operates with computer aid. Dimensions and positions of constituent parts of the pneumatic tyre 10 as well as properties of those constituent parts can be determined and evaluated on the basis of the described measuring arrangement with computer aid by the evaluation apparatus 9.

The respective rotary angle position of the pneumatic tyre 10 can be implemented by a rotary angle sensor 18 connected in conventional manner to the measuring shaft 2 of the wheel balancing machine. It supplies rotary angle increments to the evaluation apparatus 9 when the motor vehicle wheel 1 rotates. That provides positional information with respect to the respective rotary angle positions of the surface location scanned by the respective sensor device 18 on the tyre surface. A tyre inflation valve 21 whose rotary angle position on the vehicle wheel 1 is detected by the sensor device 18 scanning the outside of the vehicle wheel can serve as the rotary angle reference.

The sensor device 18 associated with scanning of the tread surface of the pneumatic tyre 10 can be disposed in the proximity of a pivot axis of a wheel guard hood which in the measuring run is pivoted over the rotating wheel in known manner.

In the measurement procedure the sensor device 18 is moved into various axial positions in substantially parallel relationship with the wheel axis 3, in the direction of the arrow 19. It is possible for example to provide five axial measurement positions. In each measurement position the spacings of the impingement spot are measured with respect to a reference position, for example with respect to the respective measurement positions, and corresponding measurement data are produced in rotary angle relationship. The measurement data are also related to the respective axial location of the measurement positions.

The measurement data are passed to the evaluation apparatus 9 which forms first harmonics from those data, with respect to the respective peripheral line. In addition the evaluation apparatus 9 includes an average value-forming means which forms an averaged first harmonic in rotary angle relationship, from the measurement data in respect of the plurality of peripheral lines.

As measurement data are obtained along the plurality of peripheral lines and the respective measurement positions of the sensor device 18 are detected in the evaluation apparatus 9, the measurement data are also related to the respective axial measurement position of the sensor device 18. A rotational truth deviation factor can be formed therefrom by means of a vector-forming device in the evaluation apparatus 9.

If the measurement operation is carried out on a balancing machine, when dynamically balancing the vehicle wheel 1 the masses required for that purpose can be minimised insofar as, with a dependency on the spatial position of the rotational truth deviation factor and the measured unbalance, the balancing masses (balancing weights) required for the dynamic balancing operation are minimised by suitable rotation (matching) of the pneumatic tyre 10 with respect to the disc wheel 5.

It is possible to derive from the averaged first harmonic a radial run-out which can be displayed in a display device 22 connected to the evaluation apparatus 9, for example a monitor. That run-out can be compared to a threshold value in respect of run-out. Quality classification of the tyres or the vehicle wheels can also be implemented in dependence on the magnitude of the run-out.

In FIG. 2, a polar plot of raw data which are measured along three peripheral lines are shown in rotary angle relationship. FIG. 3 shows schematically in a perspective view the raw data measured along three peripheral lines in a 3D plot overlapped to a vehicle wheel. FIG. 4 shows schematically in an overlapped manner to the vehicle wheel the first harmonics derived from the raw data shown in FIG. 3.

Figure 1:
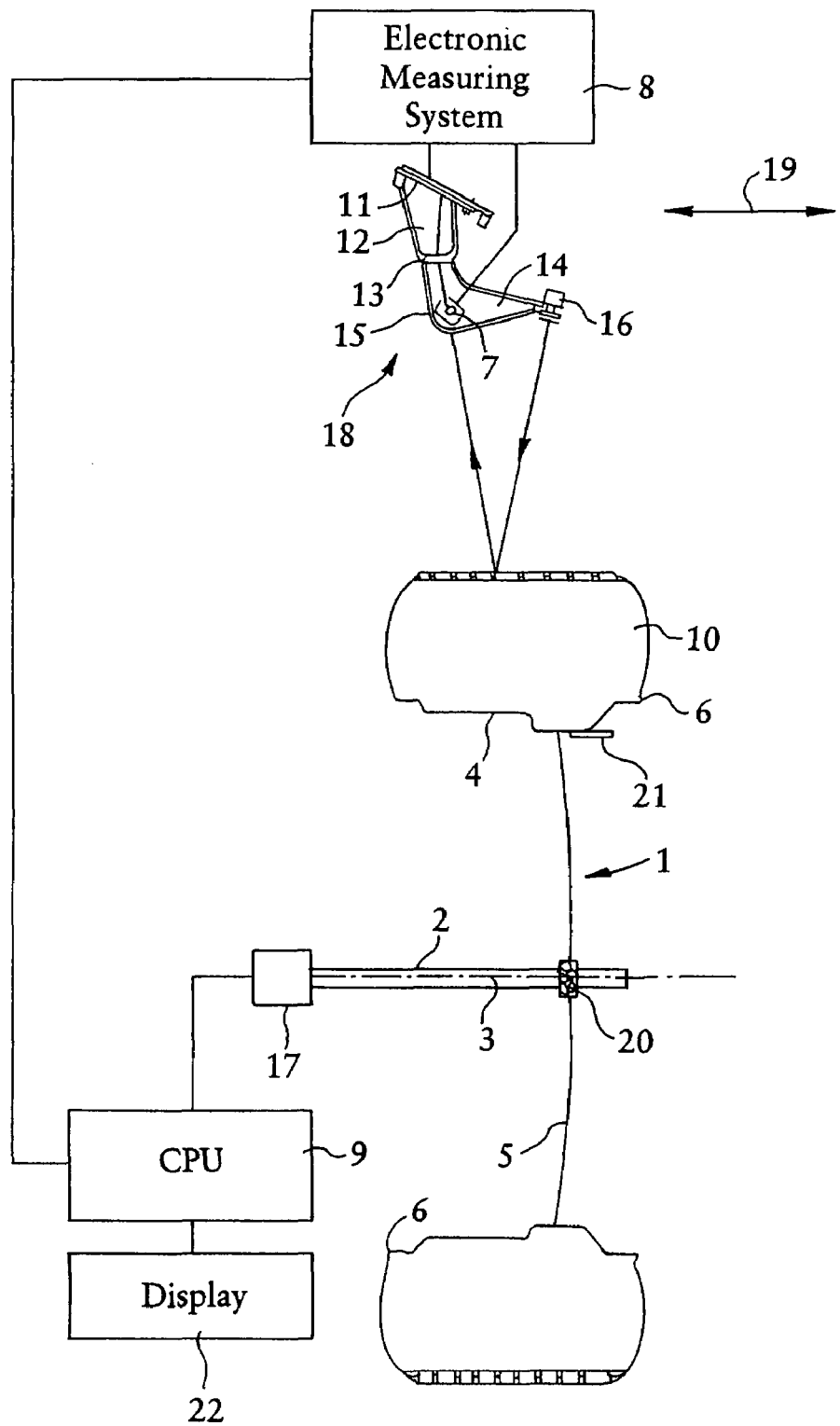
FIG. 1 is a diagram showing a wheel undergoing tire tread scanning using a wheel balancing system per this disclosure.
Figure 2:
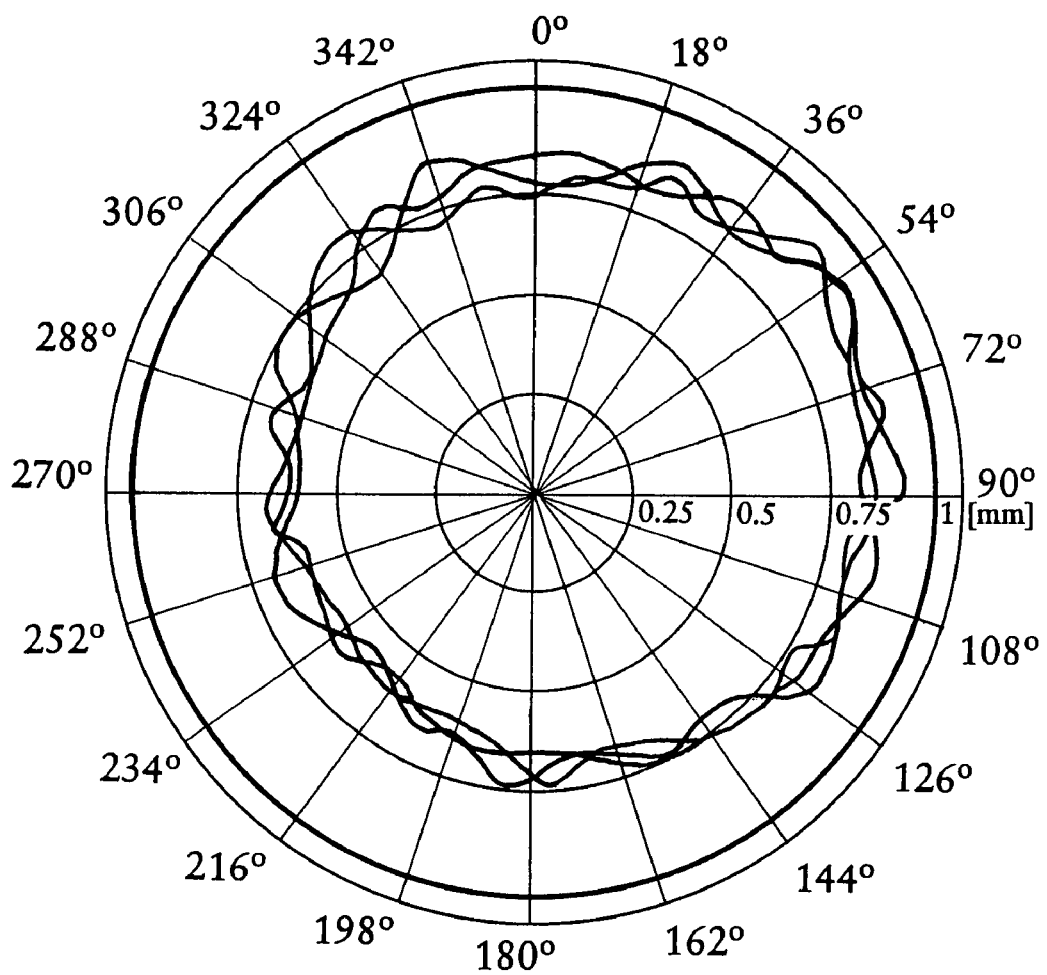
FIG. 2 is a polar plot of data measured developed by the system along three peripheral lines in a rotary angle relationship.
Figure 4:
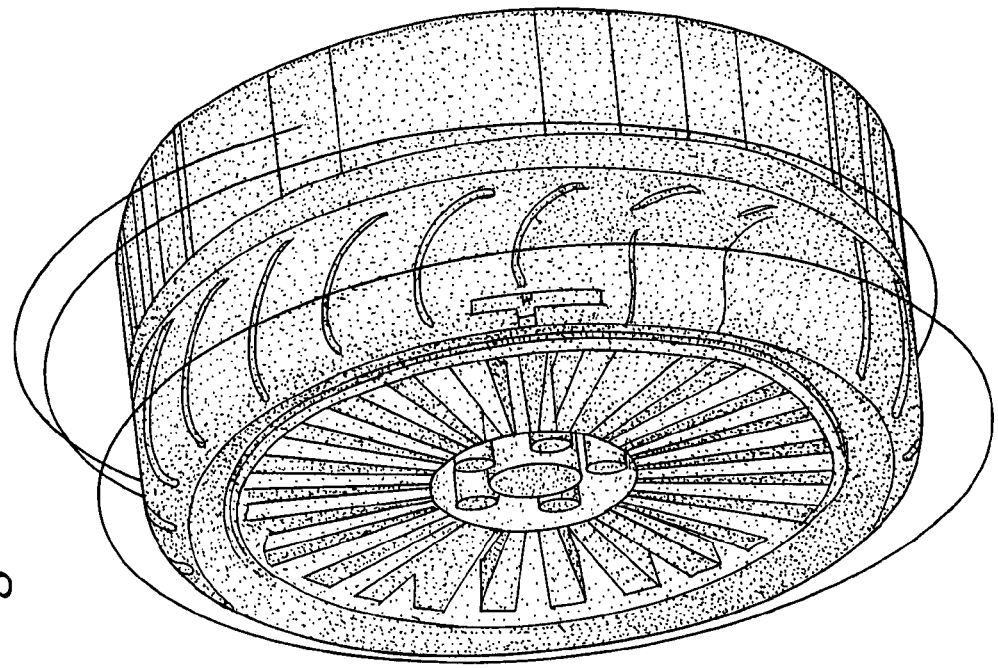
FIG. 4 shows, schematically in an overlapped manner to the wheel the first harmonics derived from the data of FIG. 3.
Figure 3:
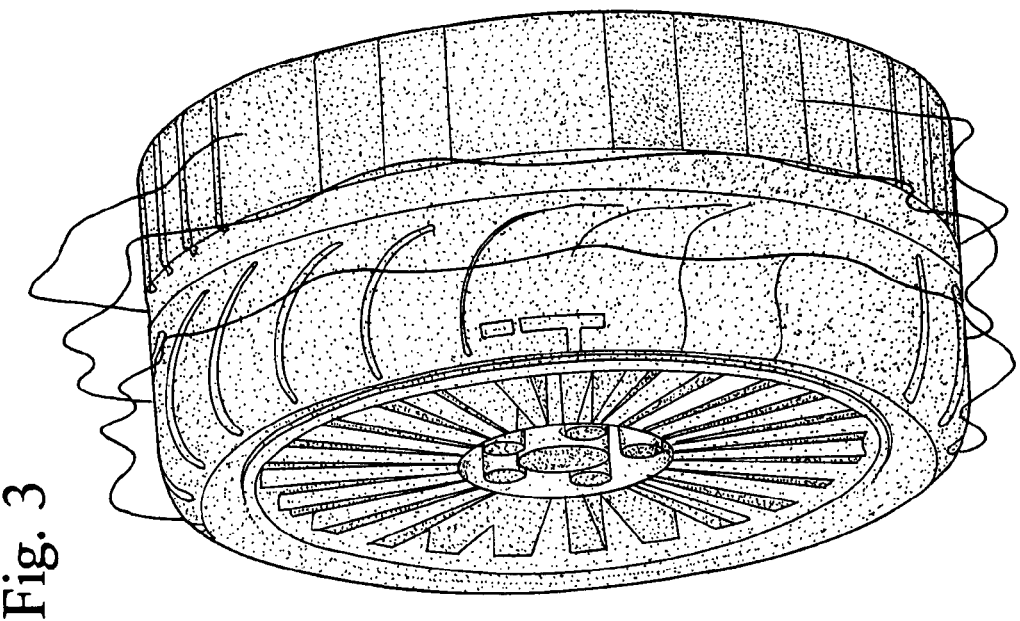
FIG. 3 shows schematically the data measured along three peripheral lines in a 3D plot overlapped to a wheel.

The invention claimed is:

1. A method of optically scanning the tread surface of a pneumatic tyre which for forming a vehicle wheel is mounted on a disc wheel, in which the vehicle wheel is rotated about a stationary axis, light beams are directed from a given position on to the tread surface of the pneumatic tyre and the directions of the light beams reflected at the surface of the tread are detected for determining the spacings of the impingement points of the light beams on the tread surface from a reference position, as measurement data, wherein the operation of scanning the tyre tread surface is carried out along a plurality of peripheral lines disposed in mutually juxtaposed relationship in the axial direction, wherein formed from the measurement data along the plurality of peripheral lines are the associated first and/or higher harmonics or an averaged first and/or higher harmonic, in rotary angle-related fashion, and wherein the pneumatic tyre is rotated with respect to the disc wheel about the wheel axis by an angle at which the mass of a static unbalance to be compensated or the masses of a dynamic unbalance to be compensated is or are minimised.

2. A method according to claim 1, characterised in that the first or the higher harmonics associated with the respective peripheral lines or the averaged first or the higher harmonic are or is recorded.

3. A method according to claim 1,
characterised in that a rotational truth deviation vector is formed from the measurement data along the plurality of peripheral lines.

4. A method according to claim 1,
characterised in that the tread surface of the tyre is scanned in point form along the peripheral lines.

5. A method according to claim 1,
characterised in that a radial run-out is ascertained from the averaged first harmonic.

6. A method according to claim 5,
characterised in that the run-out is displayed.

7. A method according to claim 1,
characterised in that the ascertained run-out is compared to a threshold value in respect of the run-out.

8. A method according to claim 1,
characterised in that the radial run out of the wheel assembly is minimised by matching a high spot of the tyre run out with a low spot of the rim run out.

9. A method, of optically scanning the tread surface of a pneumatic tyre which for forming a vehicle wheel is mounted on a disc wheel, in which the vehicle wheel is rotated about a stationary axis, light beams are directed from a given position on to the tread surface of the pneumatic tyre and the directions of the light beams reflected at the surface of the tread are detected for determining the spacings of the impingement points of the light beams on the tread surface from a reference position, as measurement data, wherein the operation of scanning the tyre tread surface is carried out along a plurality of peripheral lines disposed in mutually juxtaposed relationship in the axial direction, wherein formed from the measurement data along the plurality of peripheral lines are the associated first and/or higher harmonics or an averaged first and/or higher harmonic, in rotary angle-related fashion, and wherein from the measured data along the peripheral lines or the therefrom derived harmonics, a 3D plot where a wheel is shown schematically in a perspective view with the data overlapped to the tread is provided.

10. Apparatus for optically scanning the tread surface of a pneumatic tyre which for forming a vehicle wheel is mounted on a disc wheel, comprising a rotatable mounting for the vehicle wheel (1), at least one light source (16) which emits a light beam directed on to the tread surface of the pneumatic tyre (10), a receiver (11, 12, 13) which is movable synchronously with the light source (16) and which receives a beam reflected from the impingement spot of the emitted light beam on the tread surface and produces a signal in dependence on the receiving position at the receiver, wherein the light source (16) and the receiver (11, 12, 13) are movable in parallel relationship with the wheel axis into given axial positions and wherein in each axial position along a peripheral line rotary angle-dependent measurement data which correspond to the respective spacings of the impingement spots from a reference position are formed from the received signals, a rotary angle sender (17) which is coupled to the rotated vehicle wheel (1) and which produces rotary angle signals in dependence on the rotation of the vehicle wheel (1), and a computer-aided evaluation apparatus (9) which is connected to the rotary angle sender (17) and the receiver (11, 12, 13) and which from the formed measurement data forms first and/or higher harmonics associated with each peripheral line or a first and/or higher harmonic which is averaged from all measurement data, in rotary angle-related fashion, and a display device (22) in which a run-out can be displayed, from the measured data along the peripheral lines or the therefrom derived harmonics a 3D plot being provided where a wheel is shown schematically in a perspective view with the data overlapped to the tread.

* * * * *